(12) United States Patent
Hodes et al.

(10) Patent No.: US 9,161,085 B2
(45) Date of Patent: Oct. 13, 2015

(54) ADAPTIVE TIMELINE VIEWS OF DATA

(75) Inventors: Benjamin Neiman Hodes, Seattle, WA (US); Steven Miles Greenberg, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 762 days.

(21) Appl. No.: 13/113,105

(22) Filed: May 23, 2011

(65) Prior Publication Data
US 2012/0299926 A1 Nov. 29, 2012

(51) Int. Cl.
*G06T 11/20* (2006.01)
*H04N 21/472* (2011.01)
*H04N 21/6587* (2011.01)

(52) U.S. Cl.
CPC ......... *H04N 21/472* (2013.01); *H04N 21/6587* (2013.01)

(58) Field of Classification Search
CPC ....... H04N 21/00; H04N 21/20; H04N 21/47; H04N 21/472; H04N 21/65; H04N 21/658; H04N 21/6587; H04L 41/22
USPC ......................................................... 345/440
See application file for complete search history.

(56) References Cited

U.S. PATENT DOCUMENTS

| | | | |
|---|---|---|---|
| 5,717,869 A | 2/1998 | Moran et al. | |
| 5,874,953 A * | 2/1999 | Webster et al. | 715/733 |
| 5,880,743 A * | 3/1999 | Moran et al. | 345/473 |
| 6,232,984 B1 * | 5/2001 | Chuah et al. | 345/441 |
| 6,507,343 B1 * | 1/2003 | MacPhail | 345/440 |
| 6,600,501 B1 * | 7/2003 | Israel et al. | 715/810 |
| 6,732,170 B2 * | 5/2004 | Miyake et al. | 709/223 |
| 6,747,650 B2 * | 6/2004 | Turner et al. | 345/473 |
| 7,162,473 B2 | 1/2007 | Dumais et al. | |
| 7,518,611 B2 * | 4/2009 | Boyd et al. | 345/473 |
| 8,144,150 B2 * | 3/2012 | Gilbert et al. | 345/440 |
| 2003/0206201 A1 * | 11/2003 | Ly | 345/835 |
| 2004/0056862 A1 * | 3/2004 | Swedberg | 345/440 |
| 2004/0212636 A1 | 10/2004 | Stata et al. | |
| 2005/0120304 A1 * | 6/2005 | Miller et al. | 715/721 |
| 2005/0246119 A1 | 11/2005 | Koodali | |

(Continued)

OTHER PUBLICATIONS

"International Search Report", Mailed Date: Dec. 20, 2012, Application No. PCT/US2012/038902, Filed Date: May 21, 2012, pp. 10. (MS# 332387.02).

"Viewing and Analyzing Trace Data", Retrieved at <<http://developer.apple.com/library/ios/DOCUMENTATION/ DeveloperTools/ Conceptual/InstrumentsUserGuide/InstrumentsUserGuide.pdf>>, Dec. 10, 2010, pp. 1-27.

Al-Aziz, et al., "SOCR Motion Charts: An Efficient, Open-Source, Interactive and Dynamic Applet for Visualizing Longitudinal Multivariate Data", Retrieved at <<http://www.amstat.org/publications/jse/v18n3/dinov.pdf>>, In the Proceedings of Journal of Statistics Education, vol. 18, No. 3, 2010, pp. 1-29.

(Continued)

*Primary Examiner* — Xiao Wu
*Assistant Examiner* — Michael J Cobb
(74) *Attorney, Agent, or Firm* — Damon Rieth; Danielle Johnston-Holmes; Micky Minhas

(57) ABSTRACT

Concepts and technologies are described herein for providing adaptive timeline views of data. In accordance with the concepts and technologies disclosed herein, data is displayed in an adaptive timeline view in which data is presented using a time scale. The time scale can be modified to increase or decrease a span of time displayed by the adaptive timeline view, or a span of time can be shifted without affecting the time scale applied to the data. Motion can be used to convey information about the data during transitions from a first view to a modified view. As such, the adaptive timeline view can convey various layers of information to a user interacting with the adaptive timeline view.

15 Claims, 7 Drawing Sheets

(56) References Cited

U.S. PATENT DOCUMENTS

| | | | |
|---|---|---|---|
| 2006/0010382 A1* | 1/2006 | Ejiri et al. | 715/712 |
| 2006/0200372 A1 | 9/2006 | O'Cull et al. | |
| 2007/0214141 A1 | 9/2007 | Sittig et al. | |
| 2007/0257916 A1* | 11/2007 | Krishnamoorthi | 345/440 |
| 2008/0034307 A1* | 2/2008 | Cisler et al. | 715/764 |
| 2008/0235591 A1 | 9/2008 | Krantz et al. | |
| 2008/0307345 A1* | 12/2008 | Hart et al. | 715/769 |
| 2010/0079460 A1* | 4/2010 | Breeds et al. | 345/440 |
| 2010/0079461 A1* | 4/2010 | Breeds et al. | 345/440 |
| 2010/0235306 A1* | 9/2010 | Wagoner | 706/12 |
| 2013/0086516 A1* | 4/2013 | Rodgers | 715/799 |
| 2014/0062875 A1* | 3/2014 | Rafey et al. | 345/158 |

OTHER PUBLICATIONS

Kapler, et al., "GeoTime information visualization", Retrieved at <<http://www.palgrave-journals.com/ivs/journal/v4/n2/pdf/9500097a.pdf>>, Feb. 1, 2005, pp. 136-146.

Makar, Andrew, "Create the Timeline View in Microsoft Project 2010", Retrieved at <<http://www.techrepublic.com/blog/tech-manager/create-the-timeline-view-in-microsoft-project-2010/5245>>, Jan. 20, 2011, pp. 3.

* cited by examiner

ADAPTIVE TIMELINE VIEWS OF DATA

BACKGROUND

The proliferation of data and daily interactions with data poses new challenges for presenting data in a meaningful and/or useful manner. In particular, as users interact with data of ever-increasing degrees of diversity, the ability to quickly convey information associated with the data and/or to allow users to interact with the data in meaningful ways can be challenging. This is particularly so in light of the increasing volume of data transactions and interactions completed by users on a daily basis, and varied relationships that may exist among the data being presented to and/or interacted with by the user.

With respect to data having a time-based relationship, the data can be displayed on a timeline, on a calendar or other time-based representation. As such, users can view and/or interact with the data using familiar date- or time-based representations. As noted above, however, users may interact with a large volume of data, and traditional time- or date-based representations may provide insufficient detail to allow meaningful interactions with the data.

Additionally, various new web and software technologies, as well as increasing processor power, have allowed many software developers to make use of animations or other means to distinguish one software package form another. As such, many animations are used to enhance the user experience or to keep a user's interest during interactions with the software, but otherwise do not enhance functionality of the software package and/or interactions therewith.

It is with respect to these and other considerations that the disclosure made herein is presented.

SUMMARY

Concepts and technologies are described herein for providing adaptive timeline views of data. In accordance with the concepts and technologies disclosed herein, time-based data is displayed in an adaptive timeline view. The adaptive timeline view can present graphical representations of the data using logarithmic time scales that allow increased use of display space at and around a specified time such as, for example, a current time. A user or other entity ("viewer") can modify the time scale to increase or decrease a span of time displayed by the adaptive timeline view, also referred to herein as a "time window." Furthermore, the time window can be shifted by a user, with or without affecting the time scale applied to the data, thereby allowing a user to shift a desired time scale along various timeframes.

The adaptive timeline view can be modified by input received from a viewer, and the modifications can be made in real-time via animations and/or motions that convey additional information about the data displayed by the adaptive timeline view. For example, as a time window is shifted and/or as a time scale is modified, shifting or other movements of graphical representations of the data displayed by the adaptive timeline view can be animated so a user can understand various relationships among the data displayed. For example, movements of the graphical representations of the data can be accelerated or decelerated to indicate an increasing, or decreasing, level of relevance to a specified date such as a current time. Additionally, the adaptive timeline view can include a vertical axis that provides additional information about the data displayed, and movements along the vertical axis can be performed and animated as well. As such, the adaptive timeline view can convey various layers of information to a user interacting with the adaptive timeline view.

According to one aspect, a client device executes a data viewer application ("data viewer") configured to obtain data for display. The data viewer analyzes the data, identifies data to display in a default or specified adaptive timeline view, generates the adaptive timeline view in accordance with settings and/or input, and displays the adaptive timeline view. The data viewer also determines if input has been received from a user and if so, determines if the view is to be modified based upon the input.

If the view is to be modified, the data viewer generates the modified view and animations and/or motions to be presented to a user to transition the view from a present view to the modified view. The modified view and the animations or motions are presented to the user to convey information about the data. The data viewer can continue modifying the adaptive timeline view in response to input from the viewer.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
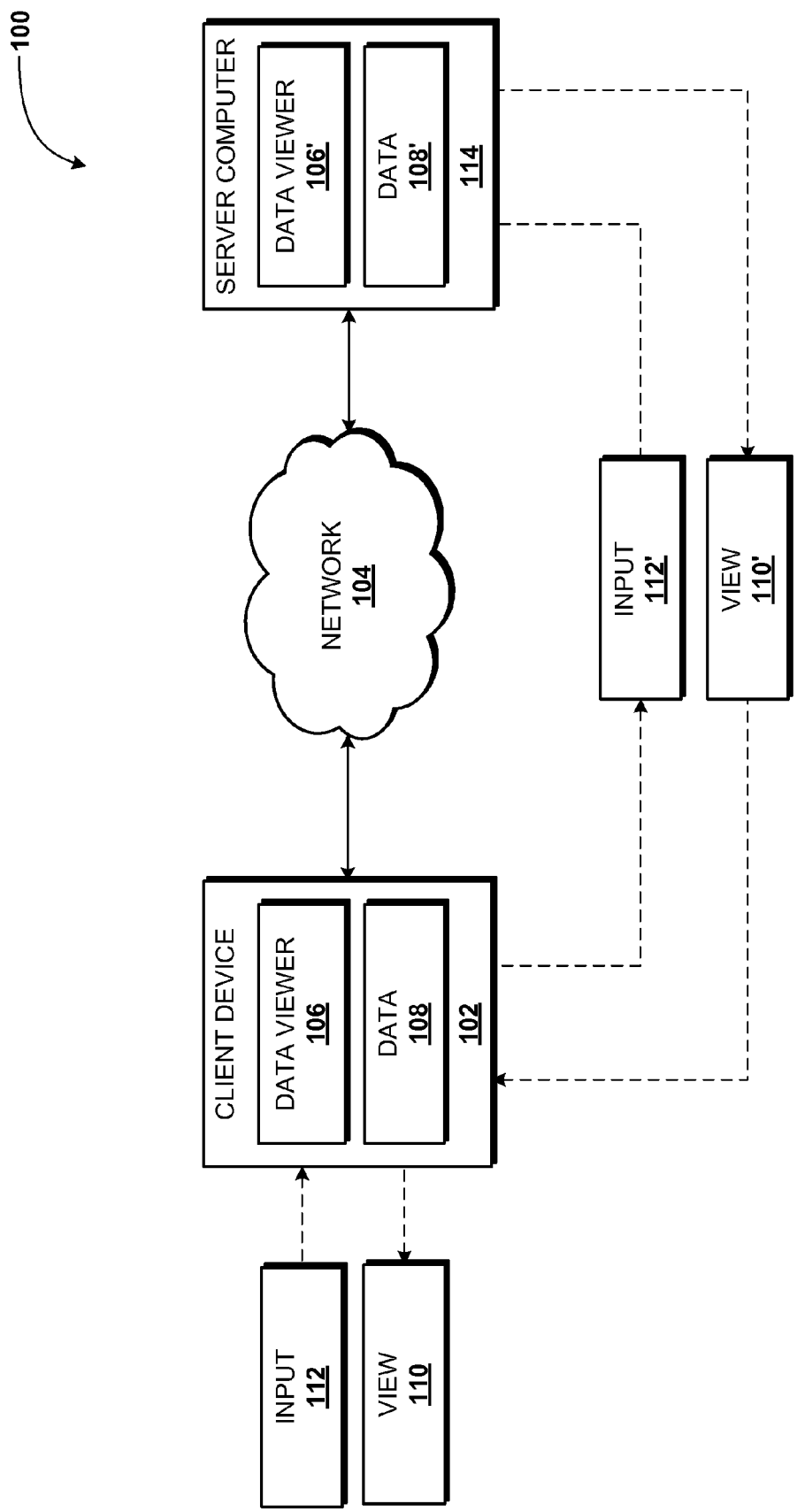
FIG. 1 is a system diagram illustrating an illustrative operating environment for the various embodiments disclosed herein.

The following detailed description is directed to concepts and technologies for providing adaptive timeline views of data. According to the concepts and technologies described herein, time-based data is displayed in an adaptive timeline view. The adaptive timeline view can present graphical representations of the data using a logarithmic time scale. As such, the adaptive timeline view can provide increased consumption of display space at or around a specified time such as a current time or another time. The time scale can be modified to change a span of time displayed by the adaptive timeline view, and/or to change how the display space is used to display the data. The span of time also can be shifted by a user with or without affecting the time scale applied to the data, if desired.

A data viewer executing on a client device or a remote computing device can modify the adaptive timeline view in response to input received by the data viewer. The modifications to the adaptive timeline view can be animated to convey additional information about the data displayed by the adaptive timeline view. The adaptive timeline view can include a horizontal axis, a vertical axis, and/or other dimensions that can provide the timeline and/or other information about the data displayed. Movements along the horizontal axis, the vertical axis, and/or other dimensions can be animated. As such, the adaptive timeline view can convey various layers of information to a user interacting with the adaptive timeline view.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for providing adaptive timeline views of data will be presented.

Referring now to FIG. 1, aspects of one operating environment 100 for the various embodiments presented herein will be described. The operating environment 100 shown in FIG. 1 includes a client device 102 operating on or in communication with a network 104. According to various embodiments, the client device 102 is a personal computer ("PC") such as a desktop, tablet, or laptop computer system. The client device 102 may include other types of computing systems including, but not limited to, server computers, handheld computers, netbook computers, embedded computer systems, personal digital assistants, mobile telephones, smart phones, or other computing devices.

The client device 102 is configured to execute an operating system (not illustrated) and one or more application programs such as, for example, a data viewer application or module ("data viewer") 106 and/or other application programs. The operating system is a computer program for controlling the operation of the client device 102. The data viewer 106 is an executable program configured to execute on top of the operating system to provide the functionality described herein for presenting adaptive timeline views of data 108.

The data 108 can be any type of data including, but not limited to, invoice data, contact data, document data, address book data, calendar data, and/or other types of data. The data 108 can be stored at, hosted by, and/or otherwise accessible by the client device 102. In some embodiments, the data 108 is stored in a data storage device associated with the client device 102. In other embodiments, the data 108 is stored at a data storage device remote from the client device 102 such as a data server, a database, a mass storage device, and the like.

According to various implementations, the data viewer 106 is configured to retrieve the data 108 from a storage device, to generate an adaptive timeline view ("view") 110 of the data 108, and to present the view 110 to a user or other entity ("viewer"). The view 110 generated by the data viewer 106 can include a timeline-based view of graphical representations of the data 108 and can be generated in accordance with various preferences, settings, or other controls configured, customized, or set by users, developers, or other entities. The data viewer 106 further can be configured to generate and present one or more user interfaces for allowing a viewer to interact with and/or manipulate the view 110 by adjusting a time scale used to present the data 108, by adjusting a time window displayed by the view 110, and/or other interactions or manipulations.

The data viewer 106 is further configured to receive input 112 from the viewer interacting with the view 110, to determine if the view 110 is to be manipulated in view of the input 112, and to determine how to manipulate the view 110 in response to the input 112. In some embodiments, the data viewer 106 modifies a time scale used to present the view 110 and/or a time window over which the data 108 is presented. The data viewer 106 also is configured to present a modified version of the view 110 to the viewer.

According to various implementations described herein, the data viewer can animate manipulation of the view 110 to impart additional meaning to a viewer interacting with the view 110. As such, the data viewer 106 uses motion and/or animation to convey information associated with the data 108 to a viewer manipulating the view 110. Several illustrative examples of modifying and animating modifying the view 110 are presented below with reference to FIGS. 2A-2D and are described herein in detail. As such, the data viewer 106 is configured to present the view 110 in a way that imparts meaning to the data 108, and to modify the view 110 and animate modifications thereof in a way that imparts further or alternative meaning to a viewer of the data 108.

According to embodiments, the data viewer 106 presents the graphical representations of the data 108 in a view 110 presented using a logarithmic time scale. Similarly, the data viewer 106 can modify the view 110 by modifying the logarithmic time scale, for example by adjusting a start time or end time associated with the logarithmic time scale, by adjusting a time window associated with the logarithmic time scale, and/or by otherwise adjusting the logarithmic time scale. The data viewer 106 can animate any changes made to the view 110, for example by adjusting the logarithmic time scale and shifting the graphical representations of the data 108 presented by the view 110 in accordance with the adjustments to the logarithmic time scale. Some embodiments of these and other animations are illustrated and described below with reference to FIGS. 2A-2D. Other types of manipulations and animations are possible and are contemplated. As such, it should be understood that these and other embodiments described herein are illustrative, and should not be construed as being limiting in any way.

Although the data viewer 106 is illustrated as being executed by the client device 102, it should be understood that the data viewer 106 can be hosted and/or executed by another device operating on or in communication with the network 104 and/or the client device 102. In some embodiments, a server-based data viewer 106' is executed by a server computer 114 operating on or in communication with the network 104. The server-based data viewer 106' can receive input 112' from the client device 102 and/or other devices, and can return the view 110' and/or modified versions thereof to the client device 102 or other devices for presentation to users or other entities. In other embodiments, the server computer 114 hosts or serves the data 108 and/or a server-based version of the data 108', and the client device 102 or other devices can retrieve the data 108 or the server-based version of the data 108'. Thus, while the concepts and technologies disclosed herein are described primarily with reference to various functionality provided by a client device 102, it should be understood that this embodiment is illustrative and should not be construed as being limiting in any way.

FIG. 1 illustrates one client device 102, one network 104, and one server computer 114. It should be understood, however, that some implementations of the operating environment 100 include multiple client devices 102, multiple networks 104, and/or multiple server computers 114. Thus, the illustrated embodiments should be understood as being illustrative, and should not be construed as being limiting in any way.

Figure 2A:
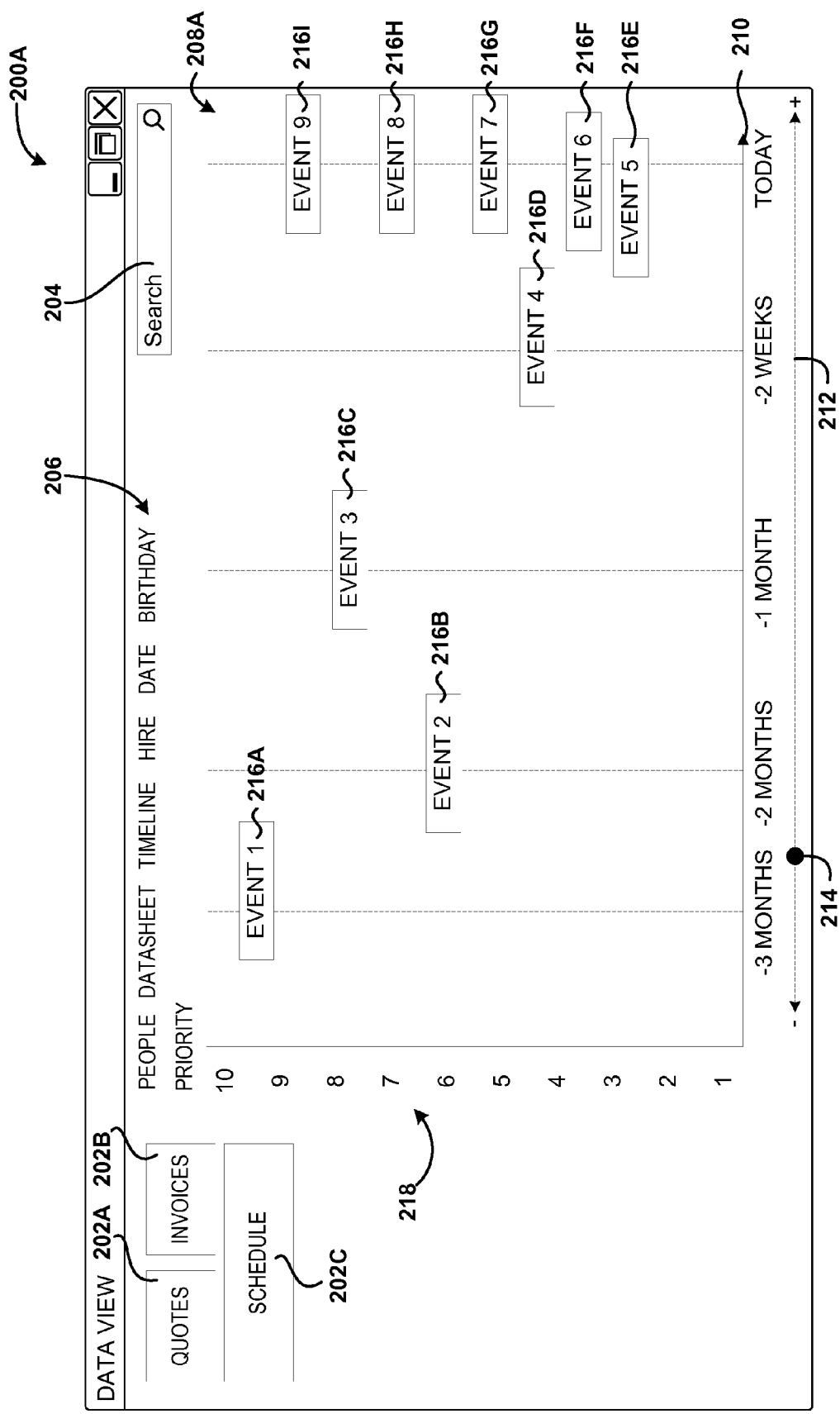
FIGS. 2A-2D are user interface diagrams showing aspects of illustrative user interfaces for presenting adaptive timeline views of data, according to various embodiments.

Turning now to FIG. 2A, a user interface diagram showing aspects of a user interface ("UI") for presenting adaptive timeline views of data in some embodiments will be described. In particular, FIG. 2A shows a screen display 200A generated by the data viewer 106 according to one particular implementation presented herein for presenting the view 110. It should be appreciated that the UI diagram illustrated in FIG. 2A is illustrative of one contemplated embodiment, and therefore should not be construed as being limited in any way.

The screen display 200A shown in FIG. 2A includes various tool bar and menu items. For example, the screen display 200A includes UI controls 202A-C for selecting from one or more categories of data that are to be displayed on the screen display 200A. In the illustrated embodiment, selection of the UI control 202A can cause the data viewer 106 to display quote data, selection of the UI control 202B can cause the data viewer 106 to display invoice data, and selection of the UI control 202C can cause the data viewer 106 to display schedule data. It should be understood that the illustrated categories of data are illustrative, and should not be construed as being limiting in any way.

The screen display 200A also includes a UI control 204 for executing a search of the data 108, and a filter menu 206 for selecting and/or applying one or more filters to the data 108. The filter menu 206 can be populated based upon one or more categories of data selected using the UI controls 202A-C. For example, in the illustrated embodiment the UI control 202C has been selected by a viewer to present schedule data. In response to this selection, the data viewer 106 populates and displays the illustrated filter menu 206 for selecting and applying various date-related filters to the data 108. It should be understood that the illustrated tool bar, menu items, categories of data, and filters are illustrative, and that additional and/or alternative tool bars, menu items, and/or filters are possible and are contemplated.

In the illustrated embodiment, the screen display 200A also displays an adaptive timeline view 208A of the data 108. The adaptive timeline view 208A can include a horizontal axis 210. In the illustrated embodiment, the horizontal axis 210 is used to provide an adaptive logarithmic timeline, the scale and extent of which can be set and/or adjusted by a viewer. It should be understood that this embodiment is illustrative, and should not be construed as being limiting in any way.

In some embodiments, the screen display 200A includes a UI control 212 for setting and/or adjusting a scale and/or extent of a time scale applied to the displayed data 108 in the adaptive timeline view 208A. In the illustrated embodiment, the UI control 212 includes a slider control 214 that can be manipulated horizontally to adjust the time scale of the adaptive timeline view 208A. Although not shown in FIG. 2A, the screen display 200A can also present one or more UI controls for adjusting the extent of the time scale used to present the data 108 in the view 110. For example, the screen display 200A can present a first control for setting a time window such as one hour, one day, one week, two weeks, a month, two months, and the like. The time window can specify a time or data range for filtering the data 108 presented in the view 110, if desired. The screen display 200A also can present a second control for shifting the time window set via the first control from or across various times in the past, present, and/or future. Thus, while the embodiment shown in FIG. 2A includes only past dates, it should be understood that future dates also can be displayed, as is described below with reference to FIG. 2D.

According to various embodiments, the time scale displayed with the adaptive timeline view 208A is a logarithmic time scale. Thus, in some embodiments, information that is closer in proximity to a present time, relative to other displayed information, is given additional display space and/or displayed with additional detail, relative to the other displayed information. For example, in FIG. 2A it can be seen that an amount of display space used to represent the time between three and two months prior to "today" is comparatively small relative to an amount of display space used to represent time between one month ago and "today." It should be understood that this embodiment is illustrative, and should not be construed as being limiting in any way.

As mentioned above, the data viewer 106 is configured to generate one or more graphical representations of the data 108. In the illustrated embodiment, for example, the screen display 200A displays a number of events 216A-I (hereinafter collectively and generically referred to as "events 216"). It should be understood that this embodiment is illustrative, and that any desired graphical representations of the data 108 can be provided in accordance with the concepts and technologies disclosed herein. The events 216 are displayed in respective horizontal locations based upon a due date, a creation date, an action date, and/or other time-based information associated with the events 216, though this is not necessarily the case.

In the illustrated embodiment, the events 216 are also positioned vertically in accordance with a vertical axis 218. The vertical location of the events 216 can reflect any desired aspect of the data 108 including, but not limited to, a priority assigned to or associated with the events 216, entities associated with the events 216 such as an entity who scheduled the events 216, locations in which the events 216 will or are planned to occur, clients or companies associated with the vents 216, costs associated with the events 216, other information, and the like. In the illustrated embodiment, the vertical position of the events 216 indicates a priority associated with the events 216, as indicated by the vertical axis 218. It should be understood that this embodiment is illustrative, and should not be construed as being limiting in any way.

It can be appreciated with reference to the screen display 200A that the adaptive timeline view 208A can be used to quickly provide information to a viewer based upon positioning of the events 216 on the screen display 200A. More particularly, as explained above in detail, a viewer can ascertain at a glance a time-based relationship between the events 216, for example, when the events 216 occur or are schedule to occur during a displayed time window, based upon respective horizontal positions of the events 216. Similarly, the viewer can ascertain at a glance the relative priority of the events 216 based upon respective vertical positions of the events 216. As will be explained in more detail with reference to FIGS. 2B-2D, manipulation and animation of the screen display 200A also can be used to inform a viewer of additional information and/or relationships among the data 108 presented by the screen display 200A.

Figure 2B:
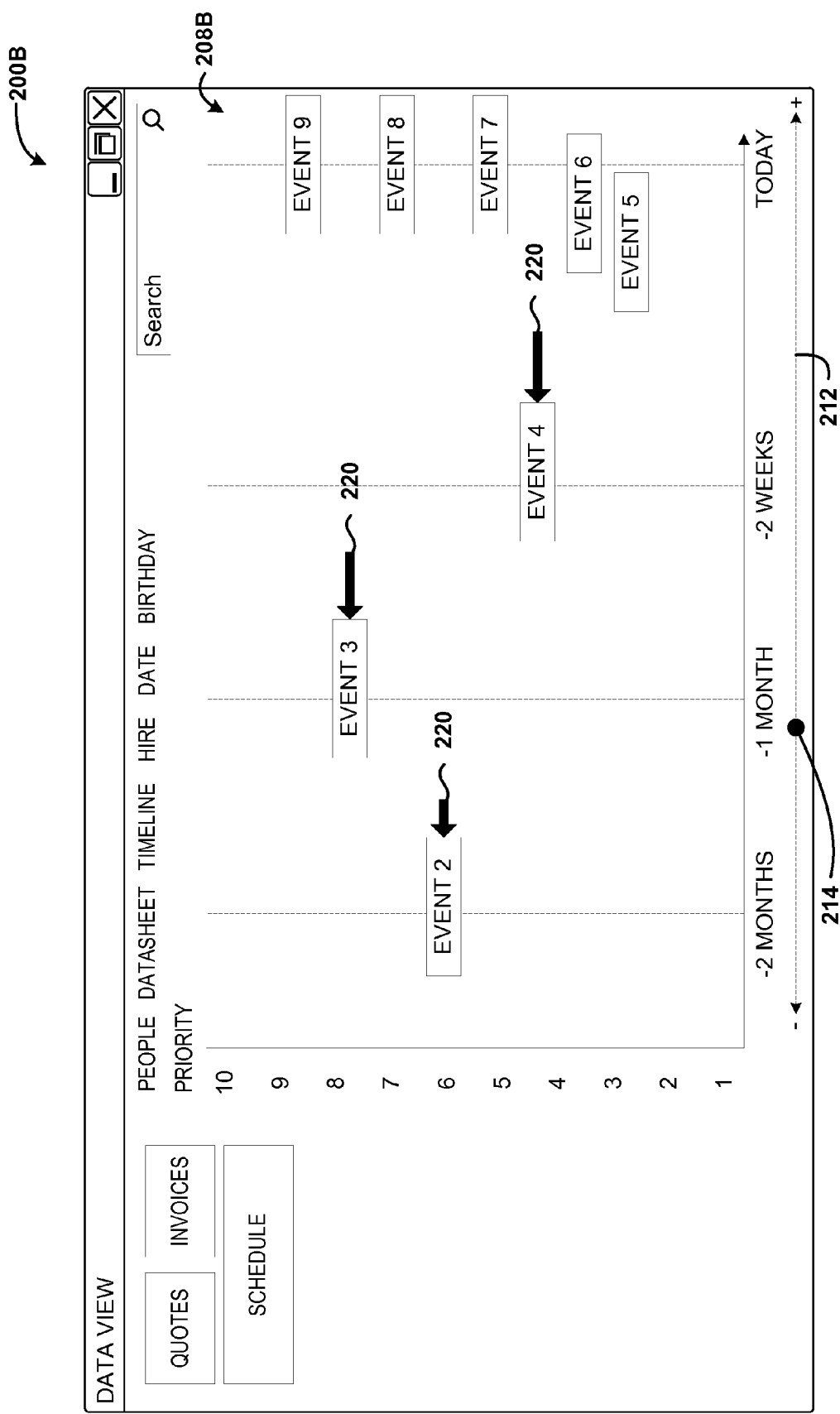

Referring now to FIG. 2B, one embodiment of modifying the view 110 is illustrated, according to some embodiments. The screen display 200B illustrated in FIG. 2B can be obtained, for example, by manipulating the UI control 212 by sliding the slider control 214 toward the "+" symbol illustrated in FIGS. 2A-2B. In response to the movement of the slider control 214, the data viewer 106 can manipulate the screen display 200A and animate movement of the various components of the screen display 200A to provide additional information to a viewer. It should be understood that this embodiment is illustrative, and should not be construed as being limiting in any way.

As shown in FIG. 2B, manipulation of the UI control 212 can be used to shorten a time window to two months from the three month time window represented in FIG. 2A. With this change, the event 216A has shifted to the left and out of the viewable space of the adaptive timeline view 208B on the screen display 200B illustrated in FIG. 2B. Similarly, the events 216B-F have been shifted to the left to maintain the events 216 in horizontal positions relative to the time scale illustrated in FIG. 2B, as illustrated schematically by movement arrows 220. It should be noted that the movement arrows 220 are varied in length to illustrate how movement of the events 216 can vary based upon respective horizontal locations and/or movements associated with the events 216 from a first view 110 to a modified view 110. As can be appreciated with reference to FIGS. 2A-2B, the horizontal location of the events 216G-I has not changed in FIG. 2B, as the horizontal position associated with "today" has not changed.

Other types of movement can convey additional information to viewers. For example, acceleration and/or deceleration can be used to provide information to the viewers. As such, events 216 whose horizontal positions are closer to "today" in the adaptive timeline view 208B may move more rapidly and/or accelerate more rapidly than events 216 farther in the past due to the logarithmic scale used to present the events 216. Similarly, it can be appreciated that the relative locations of the various events 216, relative to their respective locations illustrated in FIG. 2A, can change by varying degrees, based upon the changes to the time scales associated with the screen displays 200A, 200B. As such, it can be appreciated that the event 216B shifts to the left a first amount, while the event 216C shifts to the left a second amount and the event 216D shifts to the left a third amount. The events 216E-I also may shift to the left, though movements of the events 216E-I may be less apparent than movements of the events 216B-D. It should be understood that this embodiment is illustrative, and should not be construed as being limiting in any way.

Figure 2C:
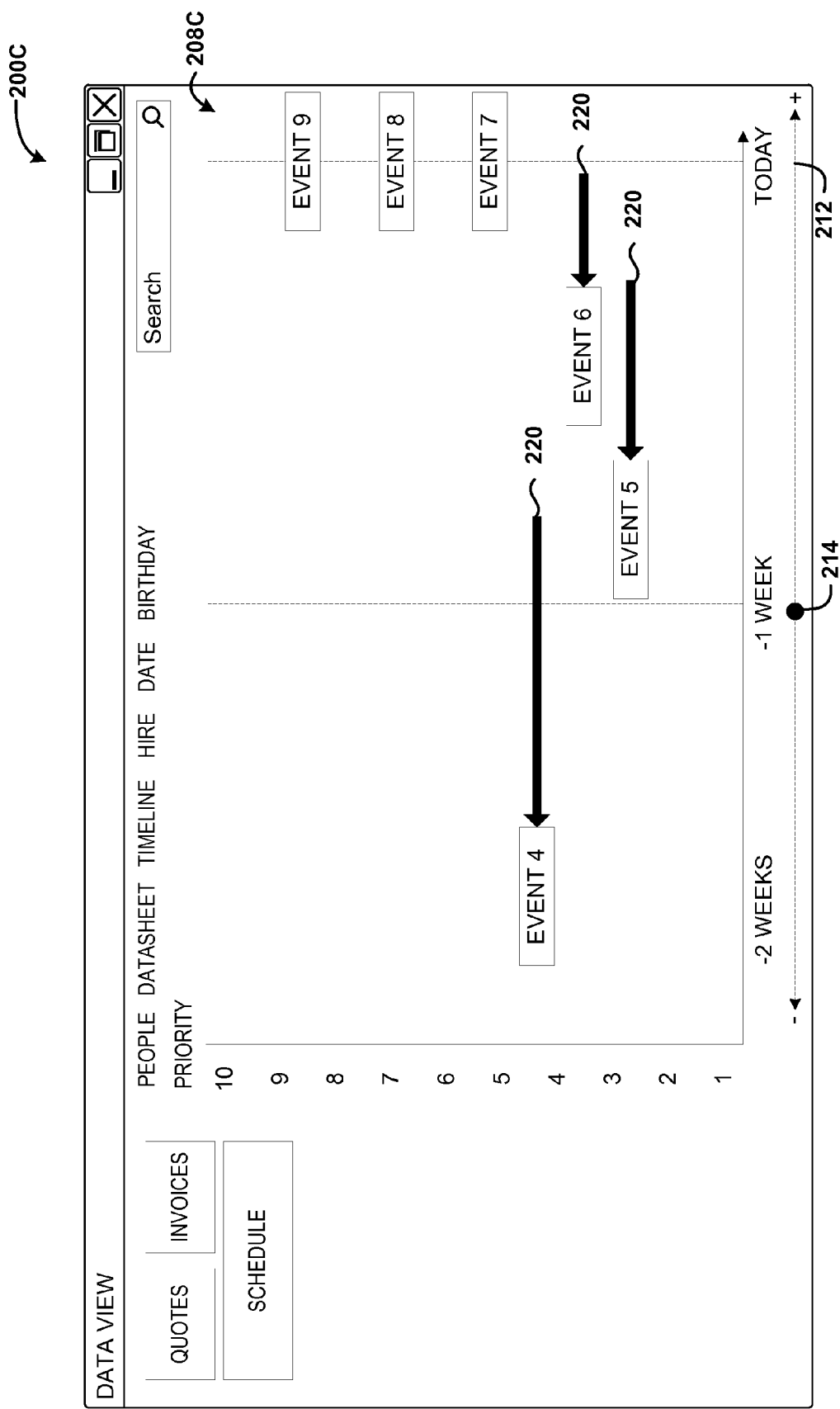

Turning now to FIG. 2C, another embodiment of an updated view 110 is illustrated, according to another embodiment. The screen display 200C illustrated in FIG. 2C can be obtained, for example, by manipulating the UI control 212 shown in FIG. 2B by sliding the slider control 214 further toward the "+" symbol. In response to the movement of the slider control 214, the data viewer 106 can manipulate the screen display 200B and again animate movement of the various components of the screen display 200B to provide additional information. It should be understood that the screen display 200A of FIG. 2A can, based upon input 112 received from the viewer, transition continuously from the screen display 200A illustrated in FIG. 2A to the screen display 200C of FIG. 2C. As such, it can be appreciated that the screen display 200B shown in FIG. 2B can be an intermediate transition stage shown as the transition from the screen display 200A to the screen display 200C occurs. It should be understood that this embodiment is illustrative, and should not be construed as being limiting in any way.

As discussed above with reference to FIG. 2B, it can be appreciated with reference to FIG. 2C that the events 216D-F have again shifted to the left by varying degrees, as schematically illustrated by the movement arrows 220 shown in FIG. 2C. Similarly, the events 216B-C have shifted off the displayable space associated with the adaptive timeline view 200C. As can be appreciated with reference to FIGS. 2A-2C, the horizontal locations of the events 216G-I still have not changed in FIG. 2C, as the horizontal position associated with "today" still has not changed.

Figure 2D:
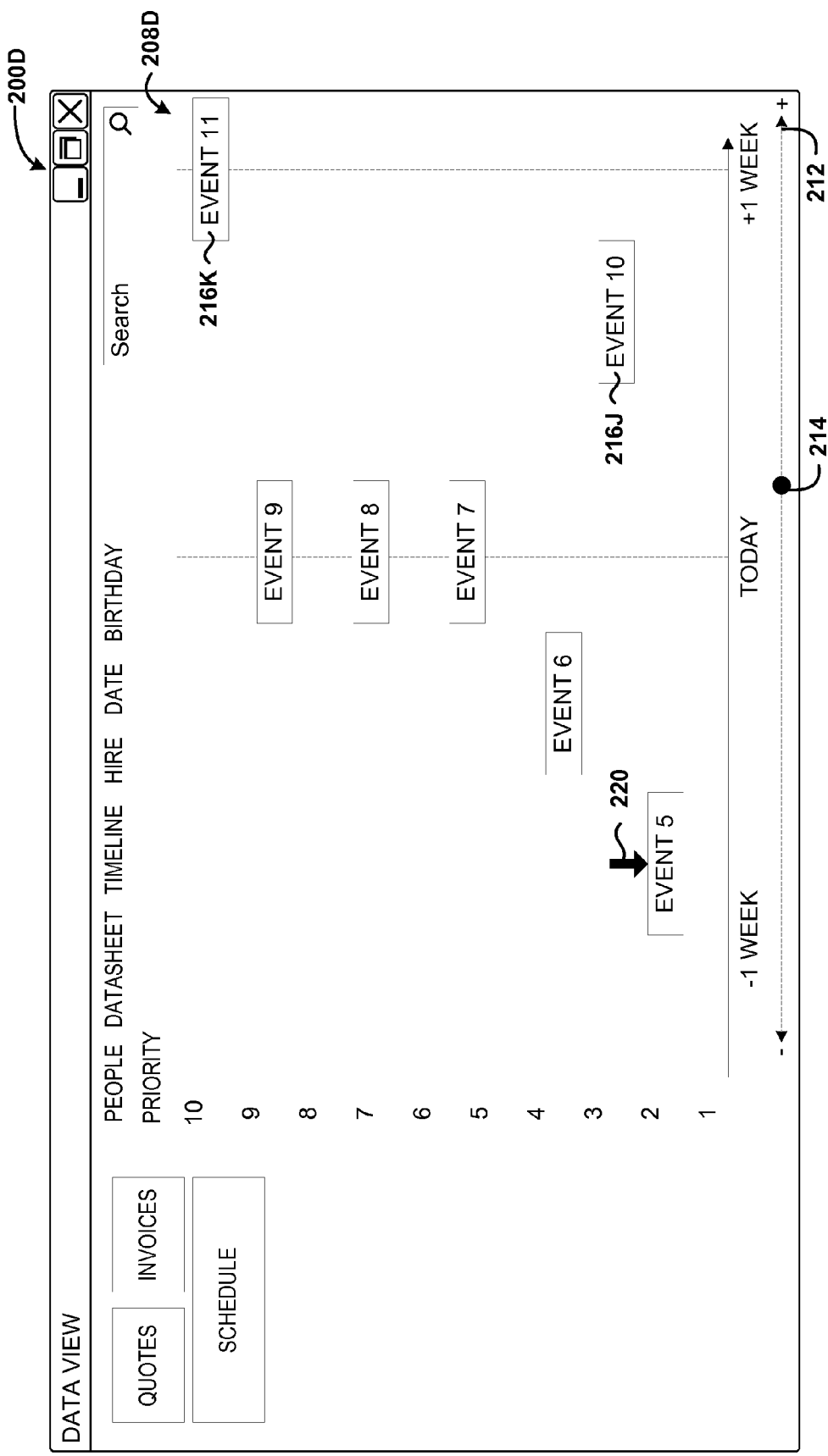

Referring now to FIG. 2D, another embodiment of an updated view 110 is illustrated, according to another embodiment. The screen display 200D illustrated in FIG. 2D can be presented by the data viewer 106, for example, in response to receiving input 112 corresponding to manipulation of the UI control 212 shown in FIG. 2C. For example, the slider control 214 may be moved from its position in FIG. 2C further toward the "+" symbol. In response to the movement of the slider control 214, the data viewer 106 can again manipulate the screen display 200C and again animate movement of the various components of the screen display 200C to obtain the screen display 200D, thereby providing a viewer with still more information about the data 108 presented by the view 110.

In FIG. 2D, the time scale used to present the data 108 has not been changed, relative to the time scale used to present the data 108 in FIG. 2C. The time window for which data 108 is presented, however, has been changed relative to FIG. 2C. In particular, the adaptive timeline view 208D includes a two week time scale, similar to FIG. 2C, while the time window has been shifted such that instead of displaying the two weeks leading up to "today" as shown in FIG. 2C, the adaptive timeline view 208D is illustrated with one week prior to "today" and one week subsequent to "today." As such, and as discussed above with reference to FIGS. 2B-2C, it can be appreciated with reference to FIG. 2D that the events 216D-I have been shifted left, but maintained in a similar or identical horizontal location relative to one another, as the time scale of the adaptive timeline view 208D has not changed relative to the adaptive timeline view 208C. Similarly, the event 216D has shifted off the displayable space associated with the adaptive timeline view 200D. It should be understood that this embodiment is illustrative, and should not be construed as being limiting in any way.

In FIG. 2D, new events 216J-K are illustrated as appearing in the display space of the adaptive timeline view 208D due to the movement of the time window as detailed above. As illustrated by the movement arrow 220, the event 216E has been shifted down vertically in response to the addition of the new event 216J. In particular, the vertical position of the new event 216J is the same as the event 216E as depicted in FIGS. 2A-2C, but the new event 216J is closer to a specified time of interest, in this case the current time, "today." As such, the new event 216J can displace the event 216E. It should be understood that this embodiment is illustrative, and should not be construed as being limiting in any way. More particularly, the events 216 can be simultaneously displayed in the same or similar vertical and/or horizontal positions in some or all circumstances, if desired.

It should be understood that while the vertical axis 218 is illustrated as having a linear scale, that the vertical axis 218 also can have a logarithmic scale and/or that the scale applied to the vertical axis 218 can be set by default, by settings, by preferences, and/or determined based upon values associated with the events 216. It also can be appreciated that the animation and/or motion described herein can be used to convey information to a viewer. For example, as a time window is shifted or as a time scale is changed and new events 216 are displayed, the addition and/or movement of the new events 216 can convey importance and/or other information to a viewer.

As mentioned above, the movements of the events 216 can accelerate or decelerate, due to the use of a logarithmic time scale, based upon whether events 216 are approaching or departing from, respectively, a specified time such as a current time, if desired. As such, acceleration of movement associated with an event 216 can convey to a viewer that a deadline or other event is approaching quickly, based upon the applied zoom, time window shift, and/or time scale modification. Also, vertical movements can be accelerated and/or decelerated based upon similar considerations, if desired. It should be understood that these embodiments are illustrative, and should not be construed as being limiting in any way.

Figure 3:
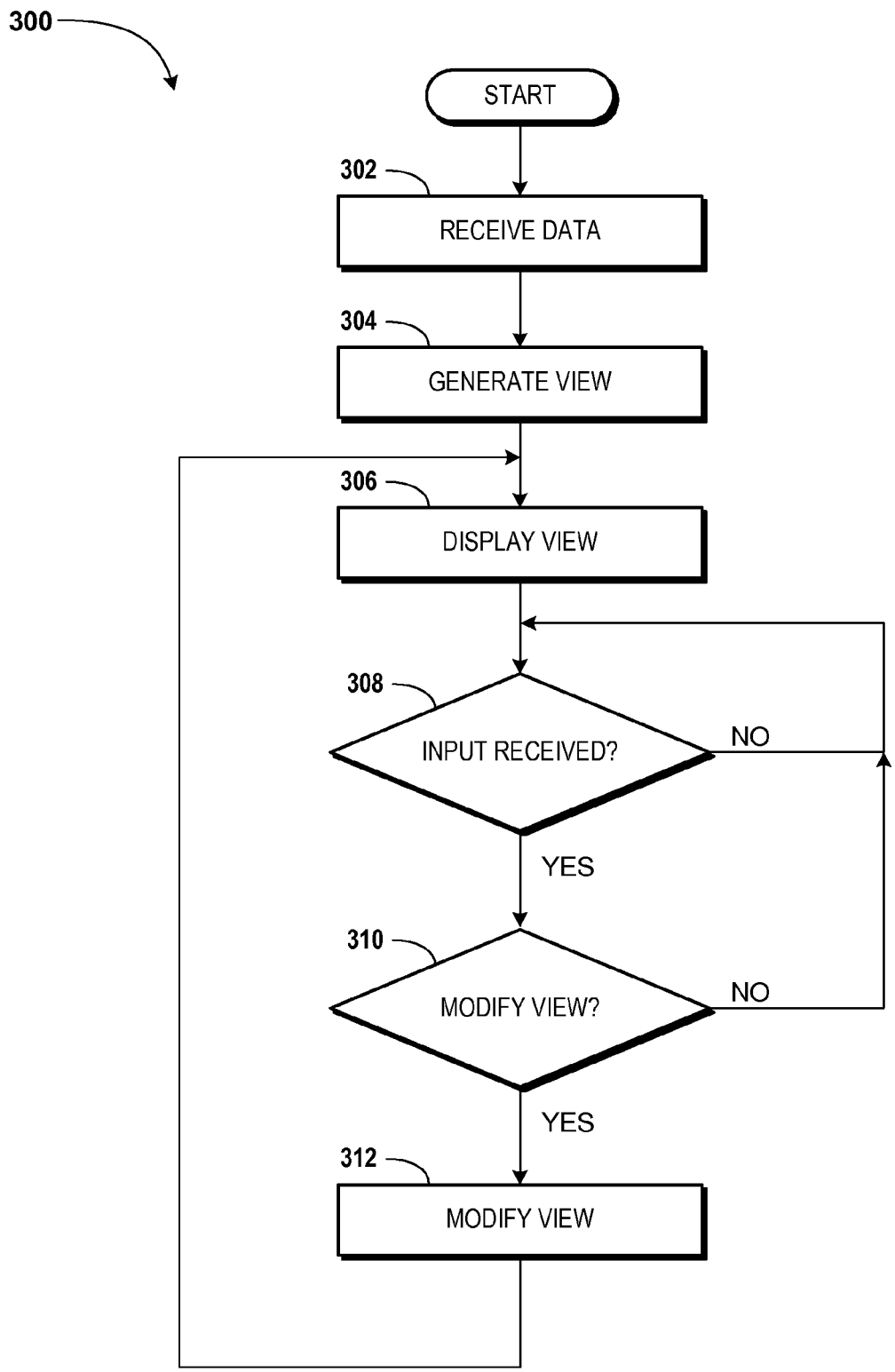
FIG. 3 is a flow diagram showing aspects of a method for presenting an adaptive timeline view of data, according to an illustrative embodiment.

Turning now to FIG. 3, aspects of a method 300 for providing adaptive timeline views of data will be described in detail. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300 and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (3) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 disclosed herein is described as being performed by the data viewer 106 executed by the client device 102. In some embodiments, as noted above with reference to FIG. 1, the client device 102 receives view data corresponding to the views 110 from a server computer 114 or other device that executes a data viewer 108'. Thus, the client device 102 can be configured to present the views 110 without generating the views 110. As such, the described embodiment should be understood as being illustrative, and should not be construed as being limiting in any way.

The method 300 begins at operation 302, wherein the data viewer 106 receives data 108. As explained above with reference to FIG. 1, the data 108 can be stored at the client device 102, at a server computer 114, or at other data storage devices. As such, operation 302 can include retrieving the data 108 from a memory, a hard drive, or other storage device associated with the client device, receiving the data 108 from a server computer, database, or other remote data storage device, and/or otherwise obtaining the data 108. It should be readily understood from the description herein that the data 108 can be or can include time-based data.

From operation 302, the method 300 proceeds to operation 304, wherein the data viewer 106 generates a view 110 based upon the data 108. The data viewer 106 is configured to determine what data 108 to display, and to display the determined data 108 in an adaptive timeline view, as discussed and illustrated above. For example, the data viewer 106 can identify a default or specified time window and determine what, if any, of the data 108 falls within the identified time window. The time window can be specified by a developer or user associated with the data viewer, set as a default value, determined based upon times associated with the data 108 identified for display, configured in settings or preferences by a user or other authorized entity associated with the data viewer 106, based upon input received from a user, viewer, or other authorized entity, and/or otherwise determined or specified.

In operation 304, the data viewer 106 also can determine a time scale to use when displaying the data 108. The data viewer 106 can determine the time scale, for example, by determining times associated with the data 108 and/or by determining how times associated with the data 108 are distributed over a time window. The data viewer 106 also can determine the time scale, for example, based upon default settings or preferences, based upon input from the user, and/or via other input or analysis. According to various implementations, the data viewer 106 is configured to assume, by default, that a logarithmic time scale is a preferred time scale for displaying the data 108. The time scale can be, for example, based upon a time or date function based upon a start time or date of the time window, an end time or date of the time window, if the time window extends into the past, future, or both, and/or upon other considerations.

More particularly, if the time window extends into the past, the data viewer 106 can determine that the time scale is to be configured such that additional display space is used to display data 108 closer to a current date, relative to other data 108 within the time window. Similarly, if the time window extends into the future, the data viewer 106 can determine that the time scale is to be configured such that additional display space is used to display data 108 closer to the current date. If the time window extends over past times and future times, the time scale can include a combination of time scales such that data 108 close to a current time, whether in the past or in the future, are given additional detail relative to other data 108 within the time window. Thus, it should be understood that the time scale can include a combination of one or more time or date functions. It should be understood that these embodiments are illustrative, and should not be construed as being limiting in any way.

From operation 304, the method 300 proceeds to operation 306, wherein the data viewer 106 displays the view 110 generated in operation 304. As such, the data viewer 106 can output the view 110 to a display device associated with the client device 102. The data viewer 106 also can provide view data associated with the view 110 to other devices or programs for display to a viewer, as noted herein. As such, if the data viewer 106 is executed by a remote device such as the server computer 114 or another device, operation 306 can include transmitting the view 110 to a device such as the client device 102.

From operation 306, the method 300 proceeds to operation 308, wherein the data viewer 106 determines if input 112 has been received. As can be appreciated with reference to FIGS. 2A-2D above, the input 112 can indicate selection and/or application of one or more categories of the data 108, one or more filters, and the like. The input 112 also can indicate manipulation of a menu item or UI control such as, for example, the UI control 212 and/or the slider control 214 for adjusting one or more of a time scale used to present the data 108 and/or a time window for which the data 108 is displayed. Because other input 112 is possible and is contemplated, it should be understood that these embodiments are illustrative and should not be construed as being limiting in any way.

If the data viewer 106 determines, at operation 308, that the input 112 has not been received, the method 300 returns to operation 308. Thus, execution of the method 300 can pause at operation 308 until input 112 is received by the data viewer 106 or until the method 300 is interrupted or terminated for other reasons. If the data viewer 106 determines, at operation 308, that the input 112 has been received, the method 300 proceeds to operation 310.

At operation 310, the data viewer 106 determines if input 112 received by the data viewer 106 will modify the view 110. If the data viewer 106 determines, at operation 310, that the view 110 is not to be modified in response to the input 112, the method 300 returns to operation 308, wherein the data viewer 106 again waits for input 112 from the viewer. If the data viewer 106 determines, at operation 310, that the view 110 is to be modified in response to the input 112, the method 300 proceeds to operation 312.

In operation 312, the data viewer 106 modifies the view 110. The data viewer 106 applies the input 112 identified as being received in operation 308. As explained above with reference to FIGS. 2A-2D, the data viewer 106 can determine that the input 112 corresponds to a command to modify a time window associated with the view 110, to shift the time window associated with the view 110, to apply one or more filters to the data 108 displayed in the view 110, and to change, add, remove or otherwise modify one or more categories of data 108 displayed in the view 110, and the like.

In addition to interpreting the input 112 received in operation 308, the data viewer 106 also can determine how to animate modifications to the view 110. Thus, modifying the view as shown at operation 312 can include determining motion and generating the motions for presentation to the viewer. As explained above, particularly with reference to FIGS. 2A-2D, motion and/or other animation of modifications made to the view 110 can convey information to a viewer. For example, motion along a horizontal axis such as the time axis 210 illustrated in FIGS. 2A-2D can indicate an increasing or decreasing importance of an event 216. For example, during shifting of an event 216, acceleration or deceleration of the movement can indicate that a due date or other time associated with the event 216 is approaching or departing a specified date such as a current date.

Similarly, if new events 216 or other data 108 are added to or removed from the view 110 in response to movement of the time window or due to other considerations, the data viewer 106 can determine that one or more events 216 are to be shifted vertically and/or horizontally to accommodate the new events 216 or due to removal of other events 216. In the embodiment illustrated in FIGS. 2A-2D, for example, a new event 216 that is added to the view 110 may have a priority value that is equal to or greater than an event 216 already displayed on the display. As such, the data viewer 106 can shift one or more events 216 up or down vertically to accommodate the new event 216. It should be understood that these embodiments are illustrative, and should not be construed as being limiting in any way.

Additionally, modifying the view 110 can include calculating or recalculating a time scale to be applied to the view 110. In addition to redefining a time scale based upon a shifting start time and/or end time, the data viewer 106 can be configured to recalculate a time scale based upon distribution of times associated with data 108 displayed in the view 110, as explained above. Furthermore, if a time window is shifted from a configuration in which the time window terminated at a current time or at some time in the past to a configuration in which the time window extends into and/or terminates in the future, the data viewer 106 can determine that a time scale that grows and/or decays around a current time or other date or time of interest can be substituted for a time scale that either logarithmically grows or decays, as noted above.

In light of the above discussion, it can be appreciated that operation 312 can include processes similar or even identical to the processes described above with respect to operation 304 for generating the view 110. After modifying the view 110, the method 300 returns to operation 306, wherein the data viewer 106 displays the modified view 110. As noted above, the method 300 can be repeated continuously and/or terminated at any time.

Figure 4:
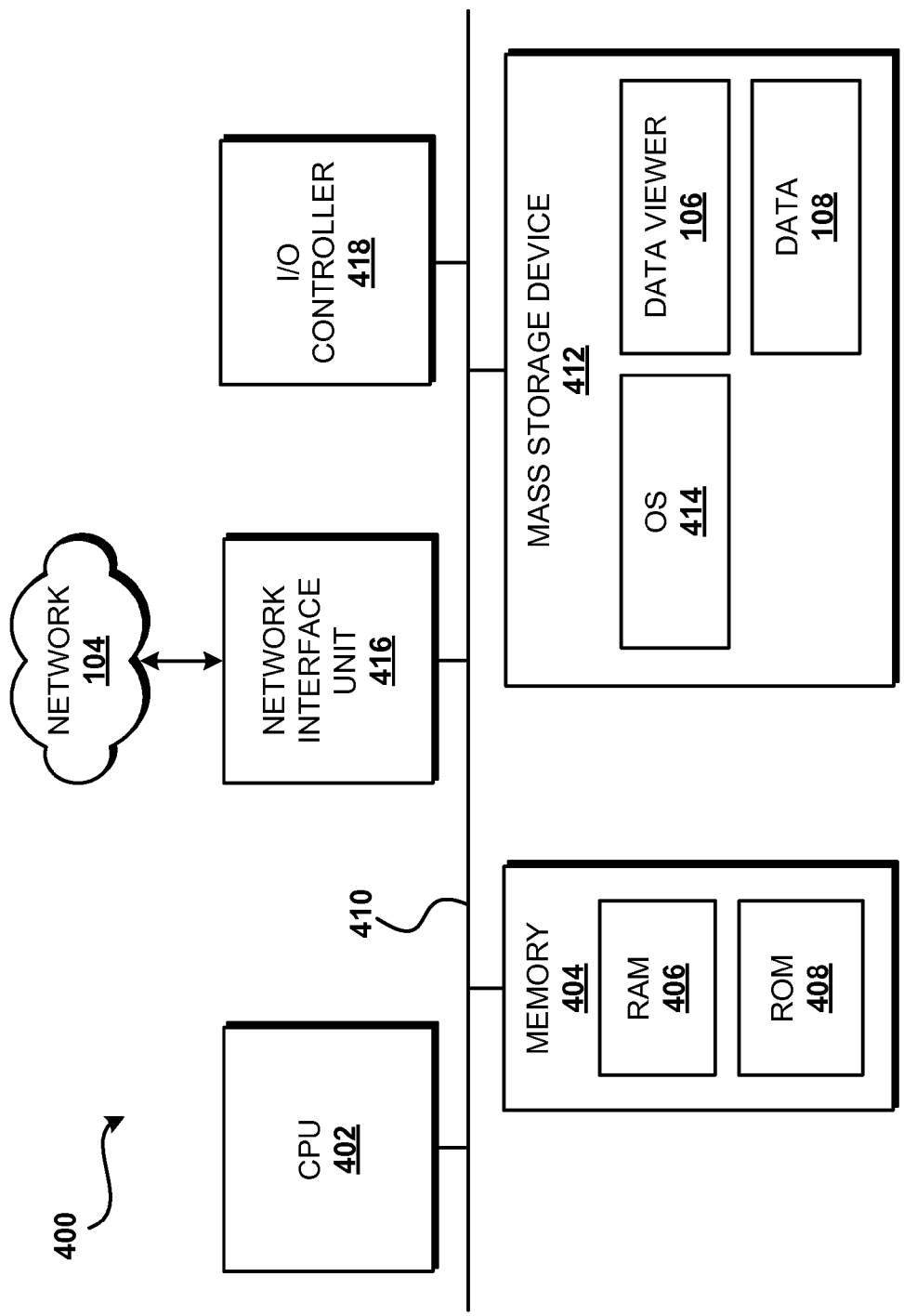
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for providing adaptive timeline views of data. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 414 and the data viewer 106. The mass storage device 412 also can be configured to store the data 108, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems, for example, the server computer 114 illustrated in FIG. 1. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for providing adaptive timeline views of data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for providing an adaptive timeline view of data, the computer-implemented method comprising performing computer implemented operations for:

receiving, at a computing system, the data, the data comprising time-based data;

generating, at the computing system, the adaptive timeline view of the data, wherein generating the adaptive timeline view comprises generating at least one graphical representation of the data, wherein the adaptive timeline view of the data comprises a time-based axis and an axis corresponding to a property of the data, wherein the axis corresponding to a property of the data corresponds to a priority of the data, and wherein a graphical position of the data on the axis corresponding to the property of the data indicates the priority of the data;

displaying, by the computing system, the adaptive timeline view including the at least one graphical representation of the data positioned relative to the time-based axis and the axis corresponding to a property of the data;

determining that an input for modifying the adaptive timeline view has been received;

determining that the adaptive timeline view is to be modified in response to determining that the input has been received; and in response to determining that the adaptive timeline view is to be modified, modifying the adaptive timeline view, wherein modifying the adaptive timeline view comprises generating a motion animating one or more changes made to the adaptive timeline view to transition the adaptive timeline view to a modified adaptive timeline view, and wherein the motion animating the one or more changes accelerates or decelerates based upon the at least one graphical representation approaching or departing from, respectively, a representation of a specified time, and wherein graphical representations of the data having horizontal positions that are closer to a representation of the specified time accelerate more than graphical representations of the data having horizontal positions that are further from the representation of the specified time.

2. The method of claim 1, wherein the data is received by a data viewer executed by the computing system.

3. The method of claim 2, wherein the time-based data comprises data having a date.

4. The method of claim 1, wherein the motion comprises shifting the at least one graphical representation relative to the time-based axis of the adaptive timeline view.

5. The method of claim 4, wherein the motion further comprises accelerating shifting of the at least one graphical representation relative to the time-based axis of the adaptive timeline view.

6. The method of claim 5, wherein the motion further comprises shifting the at least one graphical representation relative to the axis corresponding to a property of the data.

7. The method of claim 1, wherein the input comprises selection of a user interface control presented on the adaptive timeline view.

8. The method of claim 7, wherein the user interface control comprises a control for modifying at least one of a time scale or a time window associated with the adaptive time line view.

9. The method of claim 8, wherein the time scale is a logarithmic time scale.

10. A computer-implemented method for providing an adaptive timeline view of data, the computer-implemented method comprising performing computer implemented operations for:

receiving the data at a data viewer executed by a client device, the data comprising time-based data;

displaying an adaptive timeline view comprising a plurality of graphical representations of the data at the client device, wherein the adaptive timeline view of the data comprises a time-based axis and an axis corresponding to a property of the data, wherein the axis corresponding to a property of the data corresponds to a priority of the data, and wherein a graphical position of a graphical representation of the data on the axis corresponding to the property of the data indicates the priority of the data;

determining that an input for modifying the adaptive timeline view has been received by the data viewer, the input comprising selection of user interface control displayed with the adaptive timeline view;

determining that the adaptive timeline view is to be modified in response to determining that the input has been received; and in response to determining that the adaptive timeline view is to be modified, modifying the adaptive timeline view to shift at least one of the plurality of graphical representations relative to at least one of the time-based axis and the axis corresponding to a property of the data, wherein modifying the adaptive timeline view comprises generating a motion animating one or more changes made to the adaptive timeline view to transition the adaptive timeline view to a modified adaptive timeline view, and wherein the motion animating the one or more changes accelerates or decelerates based upon the plurality of graphical representations approaching or departing from, respectively, a representation of a specified time, and wherein graphical representations of the data having horizontal positions that are closer to the representation of the specified time accelerate more than graphical representations of the data having horizontal positions that are further from the representation of the specified time.

11. The method of claim 10, wherein the motion comprises shifting at least one of the plurality of graphical representations relative to the time-based axis of the adaptive timeline view.

12. The method of claim 10, wherein the data is hosted by a server computer, and wherein the server computer is configured to transmit view data corresponding to the adaptive timeline view to the client device.

13. A computer storage medium having computer readable instructions stored thereupon that, when executed by a computer, cause the computer to:

receive time-based data at a data viewer executed by a client device;

determine a logarithmic time scale to use to present an adaptive timeline view of the data, the adaptive timeline view comprising a plurality of graphical representations of the data, wherein the adaptive timeline view of the data comprises a time-based axis representing the logarithmic time scale and an axis corresponding to a property of the data, wherein the axis corresponding to a property of the data corresponds to a priority of the data, and wherein a graphical position of a graphical representation of the data on the axis corresponding to the property of the data indicates the priority of the data;

display the adaptive timeline view at the client device;

determine that an input for modifying the adaptive timeline view has been received by the data viewer, the input comprising selection of user interface control displayed with the adaptive timeline view;

in response to determining that the input has been received, determine that the adaptive timeline view is to be modified in response to the input; and in response to determining that the adaptive timeline view is to be modified, modify the adaptive timeline view in accordance with the input, wherein modifying the adaptive timeline view comprises generating a motion animating one or more changes made to the adaptive timeline view to transition the adaptive timeline view to a modified adaptive timeline view by shifting at least one of the plurality of graphical representations relative to at least one of the time-based axis and the axis corresponding to a property of the data, and wherein the shifting of the at least one of the plurality of graphical representations accelerates or decelerates based upon the at least one of the plurality of graphical representations approaching or departing from, respectively, a representation of a specified time, and wherein graphical representations of the data having horizontal positions that are closer to the representation of the specified time accelerate more than graphical representations of the data having horizontal positions that are further from the representation of the specified time.

14. The computer storage medium of claim 13, wherein the motion comprises shifting at least one of the plurality of graphical representations relative to the time-based axis associated with the adaptive timeline view.

15. The computer storage medium of claim 13, wherein the motion comprises shifting at least one of the plurality of graphical representations relative to the axis corresponding to a property of the data.

* * * * *